(12) United States Patent
Zhang et al.

(10) Patent No.: US 7,248,887 B2
(45) Date of Patent: Jul. 24, 2007

(54) APPARATUS, AND ASSOCIATED METHOD, FOR FACILITATING INITIATION OF CHANNEL ALLOCATION TO COMMUNICATE DATA IN A RADIO COMMUNICATION SYSTEM

(75) Inventors: Hongjun Zhang, Waterloo (CA); Ashok Patel, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 471 days.

(21) Appl. No.: 10/775,609

(22) Filed: Feb. 10, 2004
(Under 37 CFR 1.47)

(65) Prior Publication Data
US 2005/0054358 A1    Mar. 10, 2005

(30) Foreign Application Priority Data
Feb. 12, 2003  (WO) .................... PCT/CA03/00204

(51) Int. Cl.
*H04B 7/00*  (2006.01)
*H04Q 7/20*  (2006.01)

(52) U.S. Cl. .................. 455/509; 455/450; 455/452.1; 455/67.11; 370/332; 370/461; 370/462; 370/447

(58) Field of Classification Search ................ 455/403, 455/450, 452.1, 509, 516, 67.11; 370/447, 370/461, 462, 322, 332
See application file for complete search history.

(56) References Cited

U.S. PATENT DOCUMENTS

| | | | | |
|---|---|---|---|---|
| 6,052,594 A * | 4/2000 | Chuang et al. | ............. | 455/450 |
| 6,104,929 A * | 8/2000 | Josse et al. | ................. | 455/445 |
| 6,112,092 A * | 8/2000 | Benveniste | ................. | 455/450 |
| 6,259,724 B1 * | 7/2001 | Esmailzadeh | ............... | 375/143 |
| 6,285,662 B1 * | 9/2001 | Watanabe et al. | .......... | 370/280 |
| 6,636,738 B1 * | 10/2003 | Hayashi | ...................... | 455/450 |
| 6,681,256 B1 * | 1/2004 | Kuntze et al. | .............. | 709/236 |
| 6,965,942 B1 * | 11/2005 | Young et al. | ............... | 709/232 |
| 7,072,327 B2 * | 7/2006 | Dick | .......................... | 370/345 |
| 7,082,472 B1 * | 7/2006 | Feder et al. | ................ | 709/235 |
| 2002/0160798 A1 * | 10/2002 | Shoji et al. | ................. | 455/522 |

\* cited by examiner

*Primary Examiner*—Matthew D. Anderson
*Assistant Examiner*—Sujatha Sharma

(57) ABSTRACT

Apparatus (48), and an associated method, for facilitating operation of a mobile node (12) operable in a communication system (10) to request allocation of communication capacity upon which to communicate data pursuant to a communication service. A channel allocation request generator (52) is selectably operable to generate requests for allocation of channel capacity upon which to communicate the data. A selector (54) selects when to cause the generator (52) to communicate the additional data packets. Selection is made to delay, or otherwise prevent, retransmission of requests, when a determination is made that the retransmission is unlikely to be successful.

20 Claims, 3 Drawing Sheets

APPARATUS, AND ASSOCIATED METHOD, FOR FACILITATING INITIATION OF CHANNEL ALLOCATION TO COMMUNICATE DATA IN A RADIO COMMUNICATION SYSTEM

CROSS REFERENCE TO RELATED APPLICATION

This application claims the benefit of International Application No. PCT/CA03/00204, filed on Feb. 12, 2003, the entire disclosure of which is incorporated herein by reference.

The present invention relates generally to a manner by which to communicate data pursuant to a communication service, such as a GPRS (General Packet Radio Service), in a radio communication system. More particularly, the present invention relates to an apparatus, and an associated method, by which to facilitate initiation of allocation of channel capacity to a mobile node. Requests for allocation of channel capacity are made in a manner that is less energy-consumptive than that required of conventional techniques. When the mobile node is battery-powered, longer battery-life of a battery power supply is provided, reducing the frequency by which a user of the mobile node is required to replace the battery power supply of the mobile node.

BACKGROUND OF THE INVENTION

The need to communicate data is a necessary adjunct of many aspects of modern society. Data communication is effectuated through the use of a communication system. And, many different types of communication services are regularly effectuated by large numbers of users through use of many varied types of communication systems.

As scientific discovery and technological advancement have permitted, new types of communication systems have been developed and implemented. Such technological advancements continue. New, as well as improvements to existing, communication systems are regularly made. And, new types of communication services are regularly made possible through use of such new and improved communication systems.

Advancements in digital communication techniques are amongst the technological advancements that have been implemented to permit the introduction of new types of communication systems. The use of digital communication techniques generally provides for improved communication efficiencies and also permit data to be communicated at discrete intervals.

A radio communication system is an exemplary type of communication system that has benefited as a result of advancements in digital communication techniques, as well as other technological advancements. In a radio communication system, communication channels upon which data is communicated are defined upon a radio-link that forms at least a portion of a communication path extending between the communication stations of the radio communication system.

Implementation of a radio communication system is generally performed more economically than a wireline counterpart. The infrastructure costs associated with a radio communication system are generally less than the costs associated with installation of a network infrastructure of a wireline communication system. Also, a radio communication system can be implemented as a mobile communication system, permitting of mobile communications. Communications in such a system are possible, from and between, locations at which the use of a conventional, wireline communication system would be impractical.

Because of the advantages of use of a radio communication system, use of a radio communication system through which to communicate have achieved wide levels of popularity. While, historically, radio communication systems have been used to perform voice communication services, increasingly, radio communication systems are used to perform data services. E-mail, and other types of, messaging services, for instance, are regularly provided, and used, by large numbers of users.

And, as communication systems are increasingly permitting of higher-capacity data services, additional data services shall likely be available. For instance, GSM (Global System for Mobile Communication) networks that provide for GPRS (General Packet Radio Service) have been developed and deployed. GPRS is a relatively high bandwidth data service permitting the communication of data at relatively high data rates. Other high data-rate, data communication networks have analogously been developed and deployed, both for cellular radio networks as well as other types of radio communication systems.

When a data service is to be effectuated, channel capacity must be allocated to permit the communication of the data pursuant to the data service. The amount of channel capacity that needs to be allocated is dependent upon both the amount of data that must be communicated as well as the rate at which the data must be communicated. That is, large amounts of data generally require a greater channel allocation to permit its communication in a given time than the channel allocation required for communication of smaller amounts of data within the same, given time. And, communication of a given amount of data at a high data rate generally requires a greater channel allocation to permit its communication within a given time than the channel allocation required for communication of the same, given amount of data at a lower data rate.

The operating specification of the GSM/GPRS system specifies the manner by which channel allocation is initiated when a GPRS data service is to be effectuated. When the data service is initiated by a mobile node, for instance, a request for a channel allocation of channels upon which to send the data is generated at the mobile node. The request is communicated to the network part of the GSM/GPRS system upon a random access channel (RaCH) defined in the system. When the network part of the system receives the request, a channel-allocation decision is made. And, the decision is communicated back to the mobile node. When channel capacity is allocated to the mobile node, the decision communicated back to the mobile node forms a channel grant. And, when the channel allocation is received at the mobile node, the data is then sent by the mobile node to perform the GPRS communication service. Other types of communication systems sometimes use analogous channel request and channel allocation schemes.

During normal operation, then, channel allocation requests and channel allocation grants are generated and data is communicated to effectuate a data communication service. Problems can occur, however, in the event that the channel allocation requests are not detected by the network part or if the channel allocation grants are not detected by the mobile node.

The mobile node, typically, is powered by a portable power supply, of limited energy-storage capacity. When the portable power supply, i.e., a battery power supply, is depleted of stored energy, the mobile node no longer functions properly, if at all. And, the portable power supply must be replaced or recharged to permit continued use of the mobile node. User satisfaction with the mobile node is, at least in some respect, dependent on the longevity of the portable power supply. So, efforts are regularly made to reduce the power consumption rate of the mobile node.

In existing mobile nodes operable pursuant to the GSM/GPRS operating specification, channel allocation requests are repeatedly generated in the absence of a response to any of the requests. When conditions that prevent delivery of the channel allocation requests to the network part are only transient, return to normal conditions permits normal delivery of a channel allocation request to the network part, and a corresponding grant responsive to the request, if possible. But, when the conditions that prevent the delivery of the channel allocation requests is not merely transitory, an excessive number of channel allocation requests might be generated. For instance, if the mobile node is positioned in an area at which network coverage is unavailable, then the channel allocation requests shall not be delivered to the network part irrespective of the number of requests that are generated and sent.

Repeated generation of the channel allocation requests when delivery of the requests at the network part is unlikely to be successful is wastefully power-consumptive. Battery power-supply is depleted, necessitating frequent battery replacement or recharging.

Accordingly, if a manner could be provided by which better to select when to permit generation of channel allocation requests at a mobile node, improved longevity of the battery power supply and improved user satisfaction of use of the mobile node would be possible.

It is in light of this background information related to communications in a radio communication system that the significant improvements of the present invention have evolved.

SUMMARY OF THE INVENTION

The present invention, accordingly, advantageously provides apparatus, and an associated method, by which to communicate data pursuant to a communication service, such as GPRS (General Packet Radio Service), in a radio communication system.

Through operation of an embodiment of the present invention, a manner is provided by which to facilitate initiation of allocation of channel capacity to a mobile node.

Requests for allocation of channel capacity are made in a manner that is less energy-consumptive than that required of conventional techniques. When the mobile node is battery-powered, longer battery-life of a battery power supply is provided, reducing the frequency by which a user of the mobile node is required to replace the battery power supply of the mobile node.

In the absence of detection of a response to generation of a selected number of requests, generation of additional requests are delayed, such as for a selected time period or until communication conditions appear to have improved. Because the requests do not continue to be made, battery power is not depleted, and battery-life is extended.

A mobile node is operable to send data pursuant to a data service, such as a GPRS (General Packet Radio Service) message. When data is available at the mobile node for communication to a network part of the radio communication system in which the mobile node operates, an initial request for allocation of channel capacity upon which to send the data is requested. The request is sent to the network part. And, when delivered to the network part, a decision is made whether to allocate channel capacity to the mobile node to communicate the data. When system parameters permit, a grant of channel capacity to the mobile node is made and then communicated to the mobile node. Upon delivery of the channel allocation to the mobile node, the mobile node sends the data responsive to the allocation of the channel capacity thereto. When implemented in a GSM/GPRS system, the request for channel allocation is generated upon a random access channel (RaCH). Normal operation of the mobile node by which to request allocation of channel capacity, and to send data upon allocation of the channel capacity is thereby effectuated.

If the mobile node fails to detect a response to the initial request for allocation of channel capacity upon which to communicate the data, additional, i.e., subsequent, requests are generated by the mobile node. One or more subsequent requests are generated at selected intervals, and the mobile node continues to monitor for detection of responses to any of the prior-sent requests. In a GSM/GPRS system, for instance, the requests are transmitted upon random access channels. Due to the random-access, i.e., shared, nature of the random access channels, the requests are susceptible to collision with other signals generated elsewhere and also sent upon the random access channels. The one or more subsequent requests are sometimes sent pursuant to a retransmit scheme that attempts to reduce the possibility of repeated collisions of successive retransmissions of the requests. The number of additional requests that are generated is selectable and the times at which the subsequent requests are generated are also selectable.

In an aspect of the present invention, a determination is made at the mobile node that the network part is unavailable to the mobile node if a selected number of requests for channel allocation are generated without detection, at the mobile node, of response to any of the prior-transmitted requests. When such a determination is made, generation of an additional request is delayed. The length of the delay is a selected time period, defining a delay period. During the delay period, no additional requests are generated by the mobile node.

Alternately, when the determination is made at the mobile node that the network is unavailable to the mobile node, generation of an additional request is also delayed, but for a delay period of extending for so long as communication conditions appear to be poor. For instance, in a GSM/GPRS system, the mobile node monitors a broadcast control channel (or other channel) to obtain an indication of the communication conditions. The indication of the communication conditions comprises, for example, an indication of an RSSI (received signal strength indication) value. Another indication of the communication indicia can, instead, be utilized. When the indication of the communication conditions indicates improvement of the communication conditions at least to a selected threshold, an additional request for allocation of communication capacity is generated and sent. Thereby, repeated requests are not generated during times in which the requests appear unlikely to be delivered to the network part of the communication system.

The delay period during which the additional request for channel allocation is not generated is selectably a selected one of the set delay period and evaluation of the indication of the communication condition. For instance, the delay period is of a selected delay length unless a determination is made that the communication conditions have improved to be better than a selected threshold. If the determination is made that the communication conditions have improved to be better than a selected threshold, then a subsequent request for channel allocation is generated and sent, even though the set delay period has not expired. And, correspondingly, upon expiration of the set delay period, the subsequent request for channel allocation is generated and sent, even if the indication of the communication conditions does not indicate that the communication conditions are not at least as good as the selected threshold.

In another aspect of the present invention, the mobile node is defined in terms of channel control states that represent operation of the mobile node to initiate allocation of channel capacity by which to deliver a data service by way of a radio link. In a first state, the mobile node is operable in a normal coverage state in which channel-allocation-requesting is enabled. If a determination is made that the channel coverage conditions are poor, then the mobile node transitions to a second state. In the second state, the mobile node is operable in a poor coverage state in which channel-allocation-requesting is also enabled. But, upon determination of channel-allocation-request failure, the mobile node transitions to a third state. In the third state, the mobile node is operable in a poor coverage state in which channel-allocation-requesting is disabled. The mobile node remains in the third state until a delay timer times out or until a determination is made that the mobile node has returned to, or has entered, a normal coverage area. When the delay timer times out, the mobile node transitions back to the second state. And, if a determination is made, while in the third state, that the mobile node is in a normal coverage area, the mobile node transitions back to the first state.

In one implementation, a mobile node is operable in a GSM system that provides for GPRS. When the mobile node has data available to be sent pursuant to a GPRS, a request for channel allocation is generated upon a random access channel. The mobile node monitors for a response to the request. If no response to the initial request is detected, an additional one or more requests are generated, and the mobile node continues to monitor for a response to any of the requests. Once a selected number of requests have been generated, or requests have been generated within a selected time period, the mobile node delays sending any additional requests. The length of the delay is, selectably, a set time period or a period extending until a communication condition indication indicates that generation of an additional request is more likely to be delivered to the network part of the communication system. At the expiration of the set time period or when the communication condition indication indicates that the subsequent request shall more likely be successful, the subsequent request is made.

Because the mobile node selects not to generate the additional requests when a determination is made that the generation of additional requests shall unlikely be successful, battery capacity is conserved. Repeated requests, unlikely to be successful and also depletive of stored energy of the battery power supply, are delayed or otherwise not made. Increased usage times of the mobile node, increasing user satisfaction of the mobile node, thereby results.

In these and other aspects, therefore, apparatus, and an associated method, is provided for a radio communication system in which a mobile node selectably communicates data by way of a radio link with a network part. Initiation of allocation of channel capacity upon the radio link is facilitated. A channel allocation request generator is selectably operable when data is available to be communicated by the mobile node to the network part. The channel allocation request generator selectably generates a channel allocation request to communicate the data from the mobile node to the network part. A selector is operable at least absent of detection at the mobile node of a response to an initial channel allocation request generated by said channel allocation request generator. The selector selects when to cause the channel allocation request generator to generate at least a first subsequent channel allocation request.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
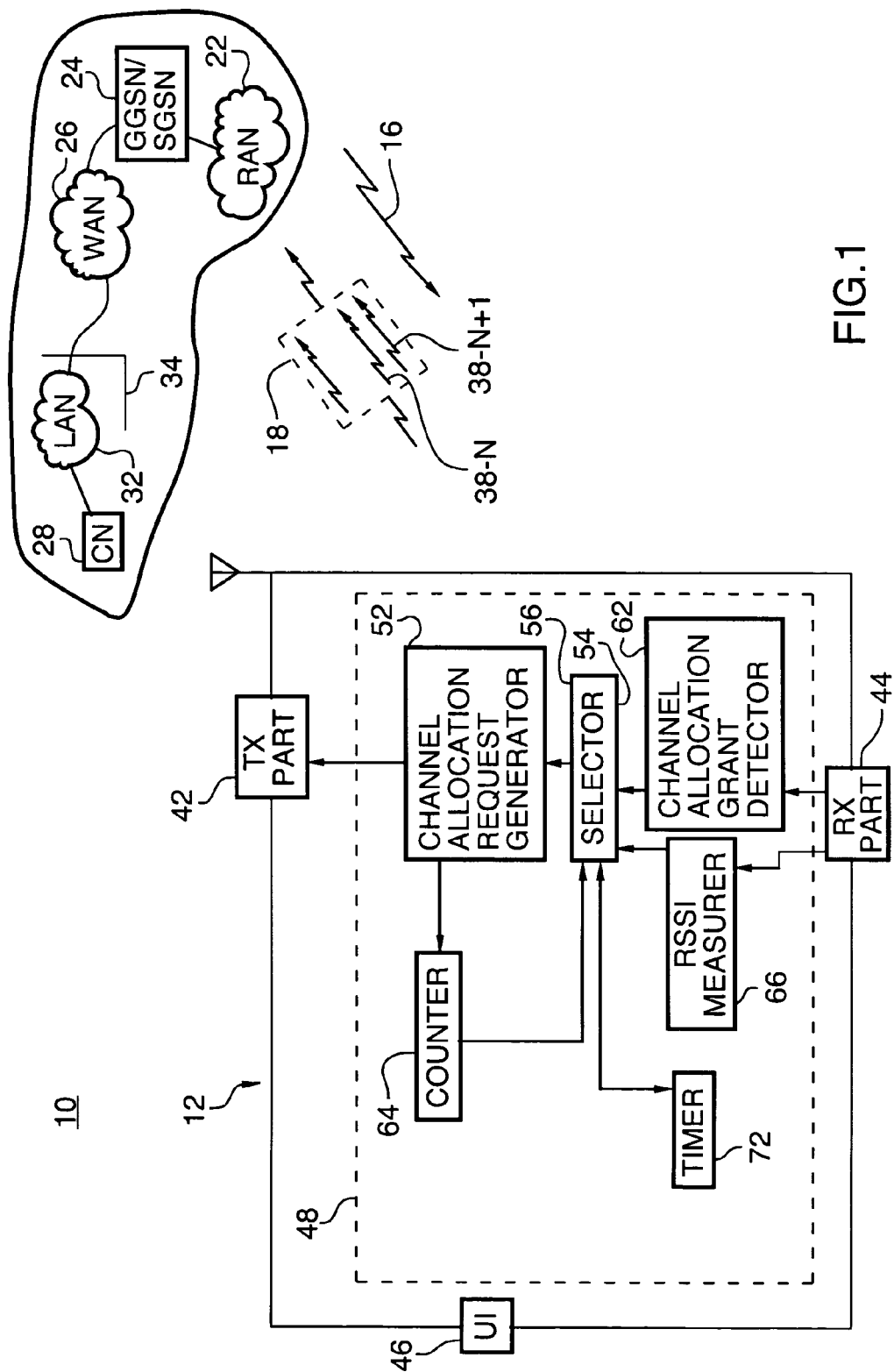
FIG. 1 illustrates a functional block diagram of a communication system in which an embodiment of the present invention is operable.

Referring first to FIG. 1, a communication system, shown generally at 10, provides for radio communications with mobile nodes, of which the mobile node 12 is representative. In the exemplary implementation, the communication system forms a multi-user system including a plurality of mobile nodes. For purposes of illustration, a single mobile node 12 is shown in the figure. Other mobile nodes can, however, be analogously represented.

The communication system 10 is representative of any of various types of radio communication systems. While the following description shall describe exemplary operation of the communication system with respect to an implementation in which the communication system 10 forms a GSM (Global System for Mobile communications) system that provides GPRS (General Packet Radio Service), the teachings of the present invention are analogously also implementable in other communication systems. Operation of an embodiment of the present invention can, therefore, analogously also be described with respect to its implementation in any of various other radio communication systems.

The communication system provides for the effectuation of data communication services, here GPRS communications. Data is communicated between the mobile node 12 and a network part 14 of the communication by way of channels defined upon radio links formed between the mobile node and the network part. Data sourced at the network part of the communication system is sent to the mobile node upon forward link channels defined upon a forward link 16, and data sourced at the mobile node is sent to the network part upon reverse link channels defined upon a reverse link 18.

Various different channels are defined upon the forward and reverse links. Details of the parameters, formatting, and other definitional criteria associated with the channels can be found in the operating specification materials promulgated by the appropriate standard-setting body and in which the operating parameters of the communication system 10 are specified. Various control, traffic, broadcast, and other channels, for instance, are defined in the operating specification materials.

The network part 14 of the communication system is here shown to include a radio access network (RAN) part 22 that includes, amongst other things, transceiver devices, referred to as base stations, that communicate by way of the forward and reverse links with the mobile node 12. The radio access network is coupled by way of a gateway 24, here represented to include the functions of a GGSN (Gateway GPRS Service Node) and an SGSN (Serving GPRS Service Node) to a wide area network (WAN) 26. The functionalities of the GGSN and SGSN can, of course, be implemented elsewhere or in other manners. And, the wide area network is here representative of the Internet or other packet data network. A correspondent node 28 is coupled to the wide area network, here by way of a local area network (LAN) 32 that is positioned behind a firewall 34.

GPRS data services are effectuable by, and with, the mobile node 12. In other types of communication systems, other types of data services are analogously effectuable. Data that is to be communicated to effectuate a data service is, for example, sourced at the mobile node. When data is available at the mobile node for communication to the network part to effectuate the communication service, channel capacity must be allocated upon the reverse link for the communication of the data by the mobile node to the network part.

The allocation of the channel capacity is granted by the network part of the communication system. And, once the channel capacity on the reverse link is made, the mobile node communicates the data on the allocated channel or channels, thereby to effectuate the communication service.

In order for the channel capacity allocation to be granted, a request for the allocation must be made by the mobile node. In the exemplary implementation, the mobile node operates to send channel allocation requests upon random access channels (RaCHs) defined upon the reverse link 18. Random access channels are utilized upon which to send signals to the network part 14 by any mobile node operable in the communication system.

The random access channels are randomly accessible by the mobile nodes. Because of the random accessibility of such channels, signals may be sent concurrently by more than one mobile node upon a random access channel. The signals are said to collide with one another in such an occurrence and a collision condition is said to result. When a collision condition occurs, the informational content of the separate signals is unlikely to be delivered to the network part. And, a signal that is involved in the collision condition must be resent in order to be detected by the network part.

Various retransmission schemes are utilized to overcome collision conditions. An exemplary retransmission scheme is referred to as a back-off scheme. The general intent of most retransmission schemes is to avoid repeated collisions of retransmitted signals on the random access channels. Upon failure of delivery of a first transmission of a signal, retransmission of the signals are generally effectuated.

The request for channel allocation might not be delivered to the network part of the communication system for other reasons, such as poor communication conditions. The mobile node might be positioned, for instance, at a location at which the requests can not be delivered to the network part. The requests might also be delivered to the network part, but responses thereto might not be able to be delivered to, or detected at, the mobile node. And, if a response to the channel allocation request is not detected at the mobile node, the mobile node is unable to send the data to the network part to effectuate the data communication service.

Unlike a collision condition, which is likely to be only transitory, positioning of the mobile node at a location in which communication conditions are poor might be relatively long-lasting. Repeated transmission of requests by the mobile node to the network part are likely to be unsuccessful and unduly consume the limited amount of stored energy, stored at a battery power supply that powers the mobile node.

Channel allocation requests generated at the mobile node and transmitted to the network part of the communication system are represented by the arrows 38 in FIG. 1. More particularly, an initial channel allocation request is indicated by the arrow 38-1, an nth channel allocation request is indicated by the arrow 38-N and a channel allocation request subsequent to the nth channel allocation request is indicated by the arrow 38-N+1.

The mobile node 12, forming a radio transceiver, includes a transmit (TX) part 42 and a receive (RX) part 44, operable respectively to send and to receive signals generated during operation of the communication system 10. The signals sent and received during operation of the respective parts of the mobile node include signals that are sent to effectuate a data communication service, here a GPRS. And, the transmit and receive parts are each coupled to a user interface (UI) 46. The user interface includes, for instance, both a user display and input actuators, such as an input keypad.

The mobile node also includes apparatus 48 of an embodiment of the present invention. The apparatus 48 is functionally represented and is formed of functional elements that are implementable in any desired manner. In the exemplary implementation the functional elements of which the apparatus 48 is comprised are formed, at least in part, of algorithms executable by processing circuitry of the mobile node. The functions of the various elements can, of course, be implemented in other manners. And, the elements of which the apparatus 48 is formed can be implemented at any structure of the mobile node, such as at, or within, the structure of the transmit and receive parts 42 and 44.

The apparatus includes a channel allocation request generator 52 that is coupled to the transmit part 42. The channel allocation request generator operates to cause generation of the channel allocation requests 38, here on RaCHs defined upon the reverse link 18. When, for instance, data is available at the mobile node for communication to the network part to effectuate a data communication service, the channel allocation request generator generates, e.g., through interaction with the transmit part 42, the channel allocation request or requests 38. The request generator may, for instance, be embodied at the transmit part 42.

The apparatus further includes a selector 54 coupled to the channel allocation request generator. The selector selects when to cause the channel allocation request generator to generate the requests for channel allocation. A line 56 extending to the selector is representative of an input line that alert the selector to the availability of data at the mobile node to be delivered to the network part to effectuate a data communication service.

And, the apparatus 48 is further shown to include a channel allocation grant detector 62. The channel allocation grant detector is coupled to the receive part 44 and operates to detect delivery to the mobile node a response to an earlier-transmitted channel allocation request. The detector can, for instance, be embodied in the receive part. The channel allocation grant detector is also coupled to the selector 54 to alert the selector of detection, or lack of detection, of the response to the earlier-transmitted request.

During normal operation in good communication conditions, a channel allocation request is generated by the channel allocation request generator when data is to be communicated pursuant to a communication service. And, the request is delivered to the network part at which a decision is made whether to grant the request. A reply granting, partially granting, or denying, the request is returned to the mobile node and detected by the detector 62. But, if the request is not received by the network part, or if the response is not delivered to the mobile node, the detector does not detect a response to the request.

A counter 64 also forms a portion of the apparatus 48. The counter is coupled to the channel allocation request generator and to the selector 54. The counter operates to count the number of requests generated by the channel allocation request generator. And, a count value is provided to the selector. In the exemplary implementation, if a response to an initial request for channel allocation is not detected by the detector 62, the selector selects to cause the request generator to generate one or more subsequent requests, here up to N subsequent requests. The additional requests are generated, for instance, pursuant to a back-off, or other retransmission scheme, to facilitate delivery of the request to the network part in the event that a collision condition prevented an earlier request, or requests, from being delivered to the network part. The counter is resetable, such as when the detector 62 detects a response to an earlier-transmitted request or when the counter counts out the N transmissions of the request.

The apparatus 48 further includes a communication condition indicator, here an RSSI (Received Signal Strength Indication) measurer 68. The RSSI measurer is coupled to the receive part 44 and is here operable to measure signal strength, or signal-over-noise, levels of network-transmitted signals on a broadcast channel. The RSSI measurer also is coupled to the selector 54 to provide the selector with indications of the measurements made by the measurer. The selector compares the measured values with a threshold level. In one implementation, the measurer performs the comparison, and the indications provided by the measurer to the selector are the results of the comparison.

In exemplary operation of an embodiment of the present invention, if N requests for channel allocation have been sent by the mobile node without detection of response, additional requests are delayed unless the measurements made be the RSSI measurer indicate that the communication conditions, evidenced by the measurements made of the signal broadcast on a broadcast channel are at least better than a selected threshold level. Thereby, repeated retransmission of requests that are unlikely to be delivered to the network part of the communication system is not made. Battery capacity is also thereby not unnecessarily depleted.

And, the apparatus 48 further includes a timer 72. The timer is also coupled to the selector 56. The timer times a selected delay period and reports to the selector when the selected delay period has timed out. The selected delay period is either a set period or a delay period that is selectably alterable, such as by the selector.

In alternate exemplary operation of an embodiment of the present invention, if N requests have been sent by the mobile node without detection of response, additional requests for channel allocation are delayed until the selected time period times out. When, for instance, the selector is notified that the count value of the counter 64 has reached a value of N without detection of a response by the detector 62, the selector causes the timer 72 to start counting. The selector delays the generation by the request generator 52 of an additional channel allocation request until the timer times out.

In an additional alternate embodiment of the present invention, the selector utilizes both the timer and the RSSI measurer, or other communication condition indicator, to select when to permit additional retransmissions of the channel allocation request. When N requests for channel allocation have been generated without detection of a response, the selector delays additional requests from being generated by the request generator. The timer is started, and measurements of the RSSI measurer are monitored. The selector delays retransmission of a subsequent channel allocation request, request 38-N+1, until the timer times out, unless the RSSI value measured by the RSSI measurer is better than the threshold level. If the RSSI value is better than the threshold level prior to expiration of the delay period timed by the delay timer, the selector causes the subsequent channel allocation request to be generated prior to the expiration of the delay period timed by the timer.

Thereby, again, repeated retransmissions of requests for channel allocation are delayed, or otherwise not made, when the retransmissions of the requests are unlikely to result in delivery of a grant, or other response, to one of the requests. Depletion of stored energy at the battery power supply caused by the repeated retransmission of the requests is avoided. Improved battery life of the battery power supply results, increasing user satisfaction with the mobile node and its use to effectuate a communication service therethrough.

Figure 2:
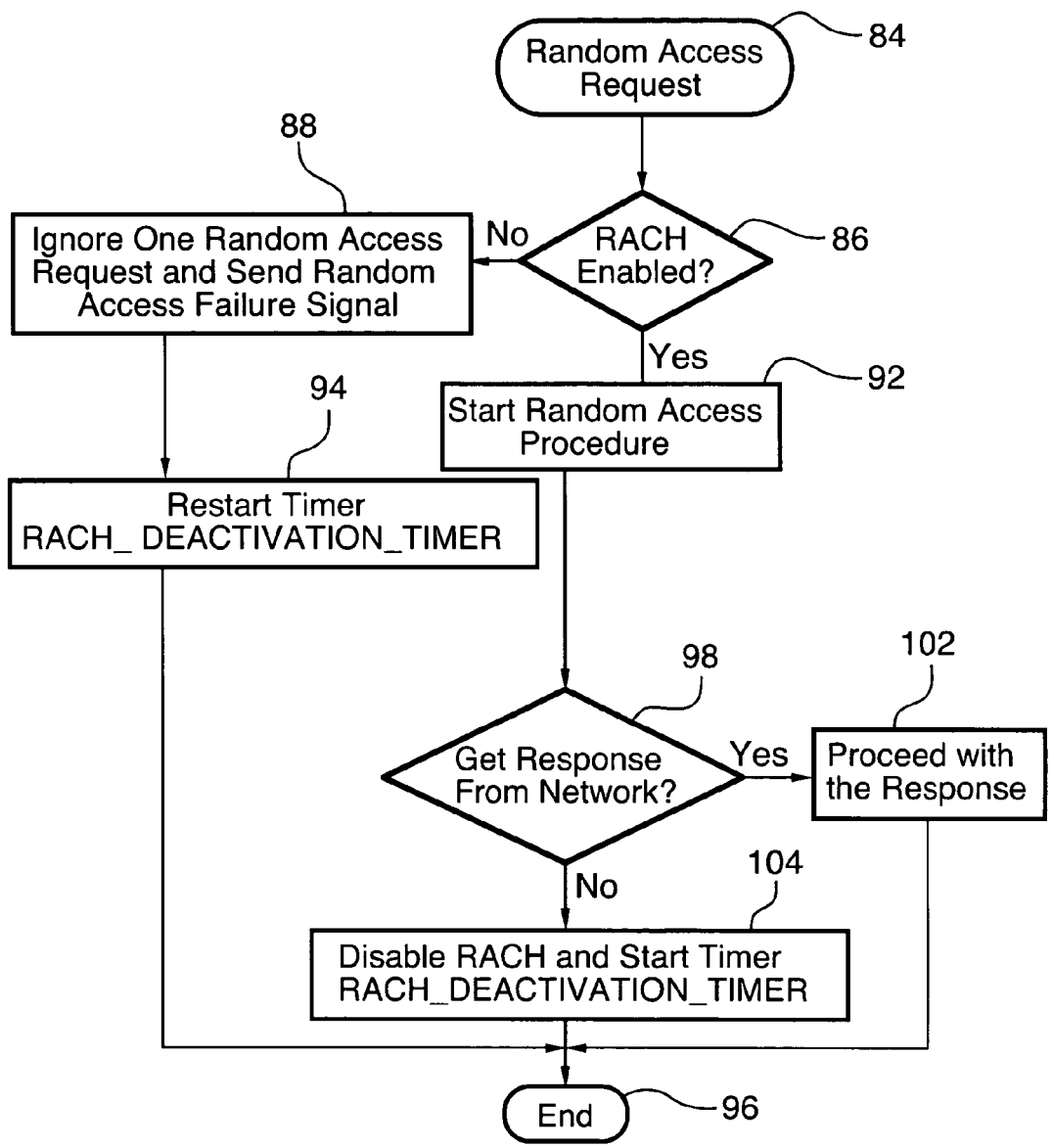
FIG. 2 illustrates a flow chart representative of exemplary operation of an embodiment of the present invention.

FIG. 2 illustrates a flow chart, shown generally at 82, representative of operation of an embodiment of the present invention. The operation represented by the flow chart is implementable, for instance, by the apparatus 48 that forms a portion of the mobile node of the communication system shown in FIG. 1.

Here, the method starts at the operation 84 at which a random access request is selected to be generated. Then, at the decision block 86, a determination is made as to whether RaCH (random access channel) operation is enabled. If not, the no branch is taken to the block 88. Conversely, if so, the yes branch is taken to the block 92.

If the no branch is taken to the block 88, the random access request selected at the block 84 is ignored. And, instead, a random access failure signal is instead sent. Then a path is taken to the block 94 and a random access channel deactivation timer, indicated by RACH_DEACTIVATION_TIMER, is started. And, a branch is taken to the end block 96.

If, at the decision block 86, a determination is made that the random access channel is available and the yes branch is taken to the block 92, the random access procedure commences. Up to a selected number of requests for channel allocation are generated at the mobile node and sent to the network part of the communication system. Then, a path is taken to the decision block 98 at which a determination is made as to whether a response from the network part has been detected. If so, the yes branch is taken to the block 102. Otherwise, the no branch is taken to the block 104.

If the yes branch is taken to the block 102, a response to a previously-sent request has been received, and the mobile node operates in conformance with the response. That is, if a grant of channel allocation has been received, the data communication is effectuated upon the allocated channel capacity. And, if the request has been denied, the data is not communicated.

If the no branch is taken to the block 104, no response to any earlier-transmitted request for channel allocation has been detected at the mobile node. And, as indicated by the block 104, the random access channel allocation-request procedure is disabled, and a delay timer, indicated here by RACH_DEACTIVATION_TIMER, is started. A branch is then taken to the end block 96.

Because the random access channel-allocation request procedure is disabled at the block 104 upon a negative determination at the decision block 98, repeated retransmissions of channel allocation requests on the random access channel are avoided, thereby preserving battery capacity at the mobile node.

Figure 3:
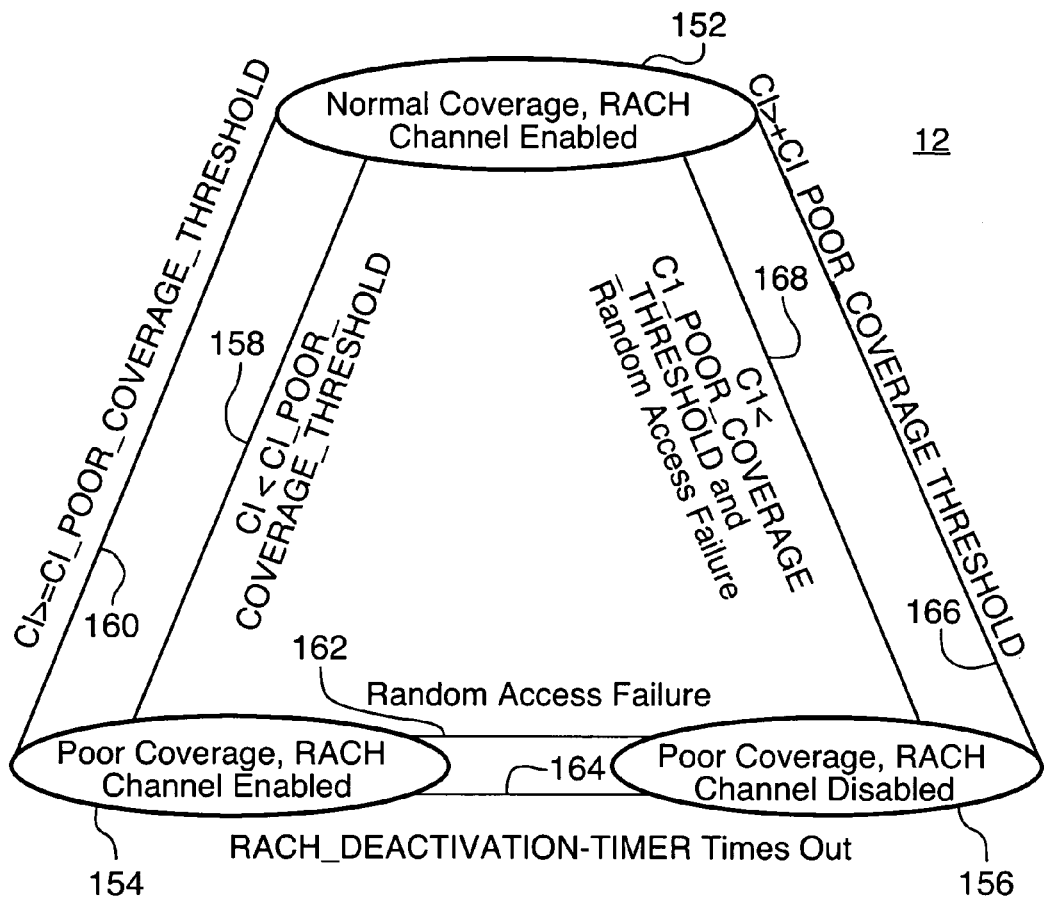
FIG. 3 illustrates a state diagram representative of the control states in which the mobile node that forms a portion of the communication system shown in FIG. 1 is operable.

FIG. 3 illustrates a state diagram representation of the mobile node 12, showing the RaCH (random access channel) control states at which the mobile node is operable pursuant to an embodiment of the present invention. Here, the mobile node is operated in one of a first operational state 152, a second operational state 154, and a third operational state 156.

The operational state in which the mobile node is operated is dependent upon conditions in which the mobile node is operated as well as historical conditions, that is, prior states at which the mobile node had previously been operated.

Operation is first described with respect to the first operational state 152. The first operational state represents positioning of the mobile node in normal coverage conditions in which communications on the random access channels are enabled. Normal coverage conditions are defined, e.g., to be conditions in which a GSM-defined, path loss criterion parameter C1 value is greater than a threshold value. When the mode is in the first operational state, channel allocation request generation upon random access channels is permitted to initiate request for allocation of channel capacity upon which to communicate data to effectuate a data service. Requests, and, if necessary, retransmission of requests, are permitted of the mobile node when the mobile node is operated in the first operational state.

If the path loss criterion parameter C1 falls beneath a threshold level, here indicated to be a C1_POOR_COVERAGE_THRESHOLD, the mobile node transitions, indicated by the transition path 158, into the second operational state 154. A transition path 160 also extends back to the state 152 if the parameter C1 rises above the threshold level. The second operational state is representative of positioning of the mobile node in poor coverage conditions but in which communication of allocation requests on the random access channels remain enabled.

Here, though, when the random access request allocation procedure fails, i.e., when a response to one or more (e.g., N) prior-transmitted requests is not detected, the mobile node transitions, indicated by the transition path 162, into the third operational state 156. The third operational state is representative of positioning of the mobile node in poor coverage conditions, here in which communication of channel allocation requests on the random access channels is disabled.

Once the mobile node enters the third operational state, the mobile node remains in the state, without generating additional requests for channel allocation. The mobile node remains in the third operational state until the a delay period times out or a determination is made that the path loss criterion parameter C1 returns, or reaches, a level at least as great as a selected threshold.

Here, when the delay period times out, the mobile node transitions, indicated by the transition path 164, back to the second operational state. The delay period is here shown to be timed by a RACH_DEACTIVATION_TIMER. Transition to the second operational state is effectuated as the mobile node remains in poor coverage conditions.

And, the mobile node transitions from the third operational state to the first operational state, indicated by the transition path 166, when the path loss criterion parameter C1 returns to, or becomes, at least a selected threshold level. The transition of the mobile node out of the third operational state and into the first operational state is indicated by the transition path 166. Here, the transition occurs when the value of C1 is at least as great as a value represented as C1_POOR_COVERAGE_THRESHOLD.

An additional transition path 168 is further shown in FIG. 3. This transition path extends between the operational states 152 and 156. The transition path is taken from the first operational state to the third operational state when the value of C1 is less than the C1_POOR_COVERAGE_THRESHOLD and a random access failure is exhibited. This transition occurs, e.g., when the mobile node fails to receive a response during the random access procedure.

Figure 4:
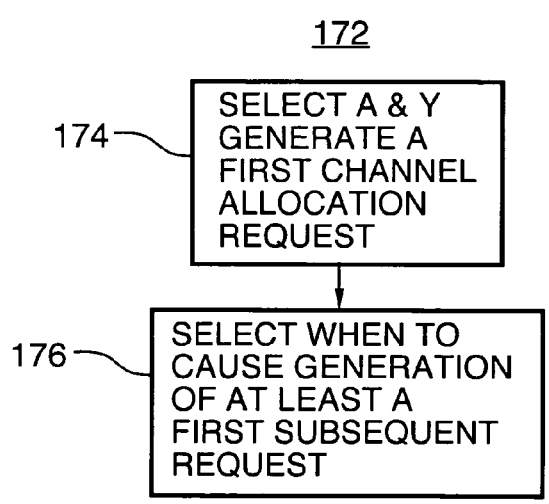
FIG. 4 illustrates a method flow diagram representative of the method of operation of an embodiment of the present invention.

The operational states shown in FIG. 4 represent implementation of network access control in normal and poor coverage conditions. When the mobile node is in poor coverage conditions, received radio signal levels, at either the mobile node or the network part, might be so low as to prevent correct decoding of the messages contained therein. Operation of the mobile node in an embodiment of the present invention described by the operational states shown in FIG. 4 limits battery depletion of the battery power supply of the mobile node.

In summary, the service areas in which the mobile node is operable is divided into normal and poor coverage areas. A normal coverage area is a service area in which the path loss criterion parameter C1 is greater than a C1-poor-coverage threshold value. Otherwise the coverage area is a poor coverage area. Access to the network by the mobile node is not limited when the mobile node is in a normal coverage area. When the mobile node is in a poor coverage area, the mobile node operates in a network access controlled state in which the random access on the random access channel is controlled.

If the mobile node is in a poor coverage area and the mobile node fails on the random access procedure due to lack of detection of a response from the network, the access of the mobile node to the random access channel is disabled and a delay timer is started. The delay period is, for instance, of between thirty and sixty second durations. If the random access channel is disabled, random access requests on the random access channel are ignored and a random access failure signal is generated and the delay timer is restarted.

FIG. 4 illustrates a method flow diagram, shown generally at 172, of the method of operation of an embodiment of the present invention. The method facilitates initiation of allocation of channel capacity upon a radio link in a radio communication system. The radio communication system includes a mobile node that selectably communicates data by way of the radio link with a network part.

First, and as indicated by the block 174, an initial channel allocation request is selectably generated. The request is to communicate data from the mobile node to the network part when data is available to be communicated by the mobile node to the network part.

Then, and as indicated by the block 176, selection is made as to when to cause generation of at least a first subsequent channel allocation request absent detection at the mobile node of a response to the initial channel allocation request.

Thereby, through operation of an embodiment of the present invention, a manner is provided by which to facilitate initiation of allocation of channel capacity to a mobile node. Power-consumptive, repeated retransmission of requests are avoided if a determination is made that a response to a retransmission request shall not be made, or detected. Longer battery-life of a battery power supply that powers a mobile node is provided.

The previous descriptions are of preferred examples for implementing the invention, and the scope of the invention should not necessarily be limited by this description. The scope of the present invention is defined by the following claims:

The invention claimed is:

1. A mobile node selectably operable in a communication system to communicate data by way of a radio link with a network part, said mobile node facilitating channel capacity allocation upon the radio link, said mobile node comprising:
   a channel allocation request generator selectably operable when data is available to be communicated by the mobile node to the network part, said channel allocation request generator for selectably generating a channel allocation request to communicate the data from the mobile node to the network part; and
   a selector operable at least absent of detection at the mobile node of a response to at least an initial channel allocation request generated by said channel allocation request generator and determination that radio communication conditions on the radio link are inadequate, said selector for selecting when to cause said channel allocation request generator to generate at least a first subsequent channel allocation request, said selection made by said selector to delay generation of the first subsequent channel allocation request for a selected delay period at least while the radio communications remain inadequate.

2. The apparatus of claim 1 further comprising a counter coupled to receive indications when said channel allocation request generator generates a channel allocation request, said counter for maintaining a count value representative of a cumulative count of channel allocation requests generated by said channel allocation request generator to request the allocation of the channel capacity to communicate the data.

3. The apparatus of claim 2 wherein said selector is further coupled to said counter to receive the count value maintained thereat, selection made by said selector to cause said channel allocation request generator to generate the subsequent channel allocation request selectably responsive to the count value maintained at said counter.

4. The apparatus of claim 3 wherein said selector further causes said channel allocation request generator to generate the subsequent channel allocation request signal when the count value maintained by said counter is less than a selected threshold.

5. The apparatus of claim 4 wherein said selector further causes said channel allocation request generator to generate subsequent channel allocation request signals at selected intervals absent detection at the mobile node of the initial channel allocation request and any prior, subsequent channel allocation requests while the count value remains less than the selected threshold.

6. The apparatus of claim 3 further comprising a radio link indicia measurer coupled to receive indicia associated with the radio link, said radio link indicia measurer for measuring a value associated with the radio link.

7. The apparatus of claim 3 further comprising a timer coupled to receive indications of when said channel allocation request generator generates a channel allocation request, said timer timing a delay period subsequent to the generation of the channel allocation request.

8. The apparatus of claim 1 further comprising a radio link indicia measurer coupled to receive indicia associated with the radio link, said radio link indicia measurer for measuring a value associated with the radio link, and wherein said selector is further coupled to said radio link indicia measurer to receive the value associated with the radio link measured by said radio link indicia measurer, selection made by said selector to cause said channel allocation request generator to generate the subsequent channel allocation request selectably responsive to the value associated with the radio link.

9. The apparatus of claim 8 wherein the network part generates a broadcast signal upon a broadcast channel defined upon the radio link and wherein the indicia associated with the radio link to which said radio link indicia measurer is coupled to receive comprises indicia associated with detection at the mobile node of the broadcast signal upon the broadcast channel.

10. The apparatus of claim 9 wherein the value measured by said radio link indicia measurer comprises a signal-strength value representative of at least relative signal strength of the broadcast signal broadcast upon the broadcast channel, detected at the mobile node.

11. The apparatus of claim 10 wherein said selector causes said channel allocation request generator to generate the subsequent channel allocation request signal when the value associated with the radio link, measured by said radio link indicia measurer, is beyond a selected threshold.

12. The apparatus of claim 1 further comprising a timer coupled to receive indications of when said channel allocation request generator generates a channel allocation request, said timer for timing a selected time period subsequent to the generation of the channel allocation request, and wherein said selector is further coupled to said timer to receive indications at least of time-out of the selected time period by said timer, selection made by said selector to cause said channel allocation request generator to generate the subsequent channel allocation request selectably responsive to time-out of the selected time period by said timer.

13. The apparatus of claim 1 wherein the radio communication system defines a random access channel and wherein the channel allocation requests generated by said channel allocation request generator are generated upon the random access channel.

14. The apparatus of claim 13 wherein the radio communication system comprises a GSM (Global System for Mobile Communications) system that provides for GPRS (General Packet Radio Service) and wherein the channel allocation requests selectably generated by said channel allocation request generator are for allocation of channel capacity upon which to send GPRS-formatted data.

15. A method of communicating in a radio communication system in which a mobile node selectably communicates data by way of a radio link with a network part, said method for controlling state transitions between mobile-node states pursuant to initiation of allocation of channel capacity upon the radio link, said method comprising:
   placing the mobile node in a first operational state in which the mobile node is permitted to request the allocation of the channel capacity upon the radio link;
   monitoring communication indicia on the radio link;
   placing the mobile node in a second operational state in which the mobile node remains permitted to request the allocation of the channel capacity upon the radio link responsive to indications that the communication indicia monitored during said operation of monitoring is beneath a first threshold level; and placing the mobile node in a third operational state in which the mobile node is prohibited from requesting the allocation of the channel capacity if the mobile node is unable, while in the second operational state, to detect a response to the channel allocation request.

16. The method of claim 15 comprising the additional operations of further monitoring the communication indicia while the mobile node is in the second operational mode, and returning the mobile node to the first operational state from the second operational state responsive to indications that the communication indicia monitored during said operation of further monitoring is above a second threshold level.

17. The method of claim 15 wherein said operation of placing the mobile node in the third operational state further comprises the operation of maintaining the mobile node in the third operational state for a selected time period.

18. The method of claim 15 wherein said method comprises the additional operations of further monitoring the communication indicia while the mobile node is in the third operational mode, and returning the mobile node to the first operational state responsive to indications that the communication indicia monitored during said operation of further monitoring is above a second threshold.

19. The method of claim 15 wherein said method comprises the additional operations of further monitoring the communication indicia while the mobile node is in the third operational mode, and wherein said operation of placing the mobile node in the third operational state further comprises the operation of maintaining the mobile node in the third operational state for a selected time period unless the communication indicia monitored during said operation of further monitoring is above a second threshold, and if the communication indicia monitored during said operation of further monitoring is above a second threshold, returning the mobile node to the first operational state.

20. A method for facilitating initiation of allocation of channel capacity upon a radio link in a radio communication system in which a mobile node selectably communicates data with a network part of the radio communication system by way of the radio link, said method comprising the steps of:

selectably generating an initial channel allocation request by the mobile node, to communicate data from the mobile node to the network part when data is available to be communicated by the mobile node to the network part; and selecting when to cause generation of at least a first subsequent channel allocation request absent detection at the mobile node of a response to the initial channel allocation request and upon determination that radio signal strength between the mobile node and network part on the radio link is inadequate.

* * * * *